UNITED STATES PATENT OFFICE.

WILLIAM C. TAYLOR, OF CORNING, NEW YORK, ASSIGNOR TO CORNING GLASS WORKS, OF CORNING, NEW YORK, A CORPORATION OF NEW YORK.

GLASS AND BATCH THEREFOR.

1,292,147.      Specification of Letters Patent.      Patented Jan. 21, 1919.

No Drawing. Application filed March 27, 1916, Serial No. 87,090. Renewed June 25, 1918. Serial No. 241,875.

*To all whom it may concern:*

Be it known that I, WILLIAM C. TAYLOR, a citizen of the United States of America, and a resident of Corning, New York, have invented certain new and useful Improvements in Glass and Batches Therefor, of which the following is a specification.

The object of this invention is to provide a glass capable of absorbing as completely as possible, in plates of small thickness, ultra-violet radiations, and being at the same time as permeable as possible to the visible radiations, and as nearly colorless as possible or of a pleasing or unobjectionable color. Such glass finds a field of use in spectacles to protect the eyes from ultra-violet rays; in the form of globes or shades to surround artificial sources of light, especially those rich in ultra-violet radiations, such as mercury arc lamps and in sheet form for windows and screens. The objectionable pathological effects of ultra-violet radiations, even if attenuated, upon the human eye, are well known.

It has been proposed to cut down the permeability of glass to the ultra-violet, by coloring the glass, but this is objectionable in that ordinarily to produce a satisfactory ultra-violet cut-off, the color must be so strong as to seriously diminish the transmission of the visible rays. It has also been noted that rare earths containing cerium, when added to the glass increase the cut-off for the ultra-violet, but the rare earth mixtures do not produce a desirable color. It has also been further proposed to neutralize the colors produced by the rare earths by the addition to the glass of substances which tend to produce therein a color complementary to that produced by the earths. Generally speaking, the result produced is not satisfactory, in that such a glass is not clear, but cloudy or muddy.

By the invention disclosed in the present application, I propose to use titanium in an oxidized form in a suitable glass to produce a desired cut-off of the ultra-violet without objectionable coloring of the glass. The titanium in this form, I have found to be about half as effective in cutting off the ultra-violet radiation as cerium oxid ($CeO_2$) in an equal percentage. I have further found that by combining titanium in suitable proportions in the glass with cerium oxid ($CeO_2$), a glass having a satisfactory cut-off and of great brightness, can be obtained. The following are batch compositions of glasses falling within this present application:—

| | A. | B. | C. |
|---|---|---|---|
| | Per cent. | Per cent. | Per cent. |
| Sand | 54 | 49 | 60. |
| Soda | 25 | 24 | 21.75 |
| Niter | 5.2 | 4.6 | 5. |
| Calcium carbonate | 6. | 5.4 | |
| Titanium dioxid | 8. | 7.7 | 4.25 |
| Cerium nitrate (pure) | | 7.7 | 7.50 |
| Vanadium oxid | | | .35 |
| Borax | 1. | .8 | .67 |
| Arsenic | .5 | .4 | .5 |
| | 99.7 | 99.6 | 100.02 |

The glass resulting from the composition A when properly melted is a pale yellow green.

The glass resulting from the composition B when properly melted, has a brilliant clear yellow, and in plates of 2 mm thickness, completely cuts out the .365 ultra-violet line. In this respect oxidized titanium produces a result when used in connection with a cerium oxid different from that due to chronium sesquioxid ($Cr_2O_3$) or iron sesquioxid ($Fe_2O_3$) which if added to a cerium glass causes a muddy effect, instead of a clear color. It should be noted that the glass containing cerium oxid (resulting from the reduction of the cerium nitrate in the batch) and titanium dioxid has a more brilliant characteristic color than would be expected from combining a superimposed glass A and a cerium glass, similar in general batch composition to composition A, but containing 8% cerium nitrate, in lieu of the 8% of titanium dioxid of composition A. When a 4 mm. layer of glass A is superimposed on a 4 mm. layer of such cerium glass, an effect of color and ultra-violet absorption is obtained similar to when a glass, having a similar color appearance to A, caused by using $Cr_2O_3$, or $Fe_2O_3$, is superimposed on the cerium glass of the composition given. However, when the coloring agent of A, namely titanium dioxid, is added to the batch of the cerium glass, (which results in a glass of composition B), an entirely different color is obtained, a more desirable hue, and moreover, the ultra-violet absorption of a 4 mm. section of B is much greater than a 4 mm. section of A plus a 4 mm. section of the cerium glass.

The ratios and amounts of the titanium dioxid and cerium nitrate may be varied according to the ultra-violet absorption and color desired.

It should be noted that the refractive index of a titanium glass is rather high, and that the addition of borax, which is in general use as a means of reducing the refractive index of glasses, causes even a higher index when titanium is present.

The glass resulting from batch-composition C, being a cerium-vanadium glass, is in part claimed in another application filed by me of even date herewith, Serial No. 87,091, but as it is also a titanium-cerium glass, and falls within the scope of the broader claims of this application, it is here disclosed. This glass has not an excessively high refractive index; has good ultra-violet absorption and satisfactory transmission. Glass C may be made with or without the use of arsenic.

The niter in batch-compositions A and B prevents the reduction of the metallic salts in fining and melting, and results in a clearer glass than would result if it were not present.

It is obvious, that while the formulæ above given are of glass batches, two or more of the ingredients of each composition may be first melted into a suitable glass to which the other ingredients may be added, and in this specification, and in the following claims, the term "batch" is used to include not only a mixture melted all at the same time, but also as being broad enough to include a case in which some of the ingredients are first melted, to which melt the other ingredients are added, or in other words, includes the synthetic formula of the glass without reference to the losses resulting from fining and melting.

It is obvious that this invention is not limited in any way to the glass-forming, or other material present in the glass in so far as such material does not interfere with the action of the materials claimed herein as producing or aiding in the production of the desired cut-off.

The use of cerium salts without salts of other metals in a glass for the purpose of absorbing ultra-violet radiation, forms the subject-matter of my other application Sr. No. 247,886 filed Aug. 1, 1918, and is therefore not claimed herein.

Having thus described my invention what I claim, and desire to secure by Letters Patent is:—

1. A glass batch containing titanium dioxid and an oxidizing salt in sufficient quantities to prevent the reduction of the titanium dioxid in melting.

2. A glass resulting from melting a batch containing titanium oxid, and an oxidizing salt.

3. A glass batch containing at least six per cent. titanium dioxid.

4. A glass batch containing at least six per cent. titanium oxid and a colorless oxidizing salt.

5. A glass containing cerium oxid and titanium oxid.

6. A glass containing cerium oxid, vanadium oxid and titanium oxid.

WILLIAM C. TAYLOR.